United States Patent Office 3,346,301
Patented Oct. 10, 1967

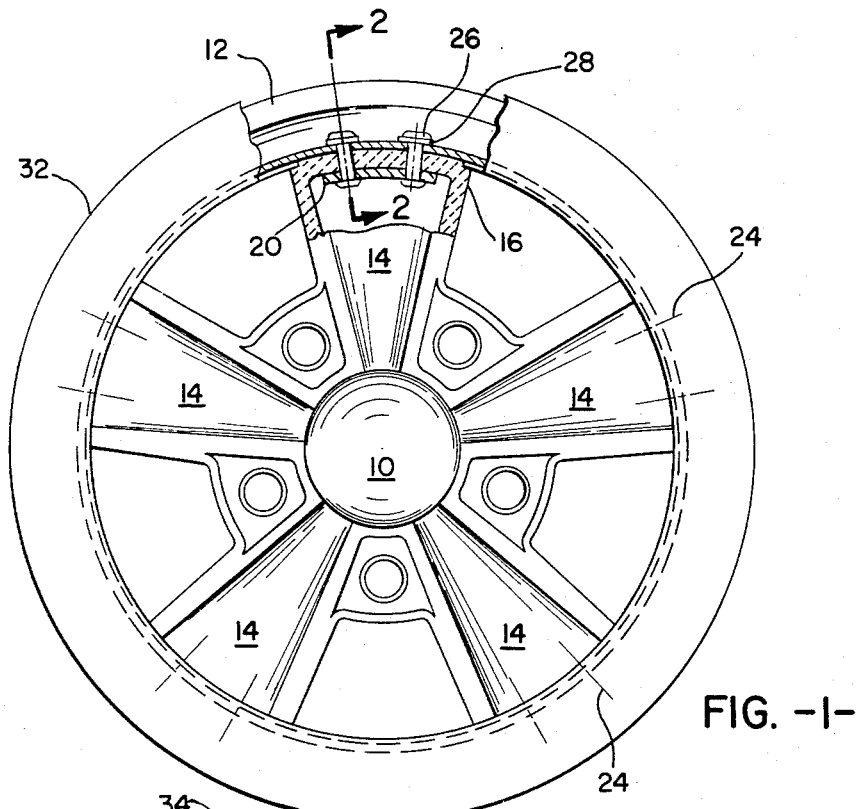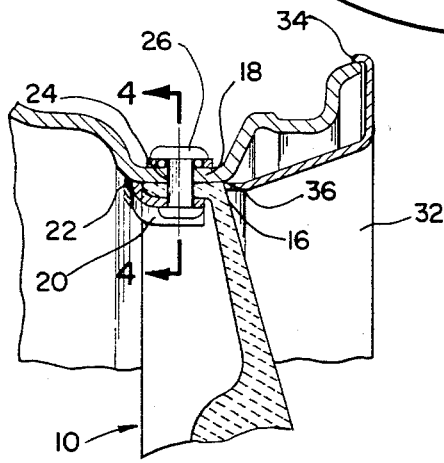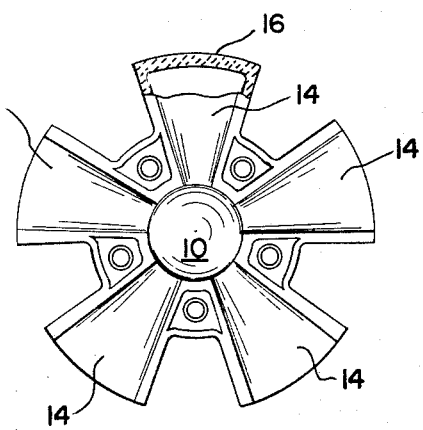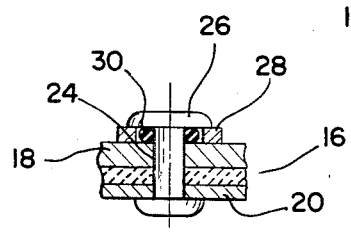

3,346,301
RIVETED AUTOMOBILE WHEEL AND RIM STRUCTURE AND METHOD OF MAKING SAME
George H. Hurst, Jr., Abington, and William G. Campbell, Chalfont, Pa. (both of 341 W. Glenside Ave., Glenside, Pa. 19038)
Filed July 23, 1965, Ser. No. 474,341
5 Claims. (Cl. 301—65)

This invention relates to a wheel of the type used on automotive vehicles.

One object of the invention is to produce an improved wheel construction.

In order to reduce the weight and the cost of material and labor, it has been proposed to make the spider or wheel body from aluminum, or an aluminum alloy, or other light corrosion-resisting material. But, experience has shown that when a steel rim is riveted or bolted to a non-steel spider, the steel rivets gradually enlarged the holes through which they passed. This produced a wobbling effect and created a leak which made the use of tube-less tires impossible.

It is therefore a further object of the invention to produce an improved wheel construction wherein the steel, tire-supporting rim, or felloe, can be successfully secured to an aluminum spider.

A steel rim secured to a highly polished spider in a manner to produce a two-piece effect is not sufficiently aesthetic for today's demands.

It is therefore a still further object of the invention to produce an improved construction which is adapted to receive an ornamental trim ring so as to create the illusion of a one-piece aluminum wheel.

From hitting curbs, and deep, steep-walled pot holes, and from accidents, the tire supporting rims get damaged more frequently than the wheel spiders and hubs.

It is therefore a still further object of the invention to produce an improved construction wherein a damaged rim can be removed to facilitate repairs so as to make it unnecessary to discard the entire wheel.

A still further object is to produce an inexpensive wheel construction which effectively overcomes all of the foregoing disadvantages.

A still further object is to produce an improved method of manufacturing a wheel embodying the structure above set forth.

The full nature of the invention will be understood from the following specification and the accompanying drawings, in which:

FIG. 1 is a side elevational view of a wheel construction embodying the invention.

FIG. 2 is an enlarged sectional view looking in the direction of line 2—2 on FIG. 1.

FIG. 3 is a reduced side elevational view of the wheel spider before the tire supporting rim is applied.

FIG. 4 is a fragmentary sectional view looking in the direction of line 4—4 on FIG. 2.

In the drawings, 10 designates the spider of a wheel and 12 the rim or felloe which supports the usual tire. The spider is preferably made of forged aluminum and may be of any desired mechanical or ornamental design. For the purpose of this disclosure, it is enough to point out that the spokes 14 of the wheel are provided with tongues, or flanges, 16 which form seats for supporting the center portion 18 of a conventional tire supporting rim.

To carry out this invention, a sufficiently thick steel plate 20 is welded, as at 22, to the underside of the center portion 18 of the tire supporting rim. As best shown in FIG. 2, the plate 20 and the adjacent portion of the rim coact to form an open-sided pocket for snugly receiving the flange 16 of a spoke 14 of the wheel. It will be understood that the number of plates will equal the number of spokes and that width of the pockets formed between the plates and the adjacent portions of the rim are so related to the thickness of flanges 16 that the flanges 16 have a driven fit in relation to the pockets.

With the flanges 16 of the spokes driven into their respective pockets, holes 24 are drilled through the center band 18 of the rim, through the flanges 16 of the spokes of the wheel, and through plates 20. It will be noted that drilling the holes through the assembled parts facilitates proper alignment and eliminates all risk of misalignment.

The rivets 26 are now applied permanently to hold the parts together. It will be noted that, in addition to passing through the steel rim, the aluminum flanges and the steel plate, the rivets also squeeze the aluminum flanges 16 of the spokes between the steel plate and the rim. This permits the application of much more rivet pressure than can be applied directly to an aluminum plate and prevents the rivets from enlarging the holes in the aluminum flanges of the wheel spokes.

Further to spread the pressure and to insure an airtight seal, steel washers 28 are used in connection with one, or both, of the rivet heads, and to insure an air-tight seal, O-ring gaskets 30 are used in conjunction with the steel washers, FIG. 4.

A trim ring 32 which engages the outer edge of the tire-supporting rim, as at 34, and the junction of the wheel spoke with the tire-supporting as at 36, covers the steel rim and creates the illusion of an all-aluminum wheel.

It will be noted that, by the above construction and by the method outlined, an aluminum spider can be used with a steel tire-supporting rim with complete protection against loosening and air leaking and that, when steel washer 28 is used, so that the rivets engage the washers and steel plate 20, the tire-supporting rim may also be made of aluminum, or other non-ferrous alloy, because the steel washer and the steel plate permit the application of the requisite pressure without deformation of the softer alloy.

What we claim is:
1. A wheel including a spider having a plurality of spokes each comprising a radial portion and a flange substantially normal to said radial portion,
   a tire supporting rim, a plate secured along one edge thereof to the inner periphery of said rim and coacting therewith to form a pocket for receiving said flange, and
   fastening means passing through said rim, said flange, and said plate.
2. The wheel defined in claim 1 in which said spider is made of a metal other than the metal of which said rim and said plate are made.
3. The wheel defined in claim 1 in which the plate and the rim are ferrous and the spider is non-ferrous.
4. The method of making an automobile wheel of the type which includes
   a wheel body comprising a plurality of spokes and a tire-supporting rim carried by said spokes, which method consists in providing at least some of the spokes with flanges substantially normal to the axes of the respective spokes, attaching plates to the inboard portion of the rim in spaced relation to the center portion of the rim to provide pockets for receiving the flanges, inserting said flanges into said pockets to integrate said rim and said spokes, drilling holes through said rim, said flanges and said plates, and passing rivets or the like through said holes to secure said rim to said spokes.

5. The method defined in claim 4 and the additional step of placing a washer and a gasket around the rim end of each of said holes before passing said rivets therethrough.

References Cited

UNITED STATES PATENTS

| 1,089,445 | 3/1914 | Stapleton | 152—76 |
| 1,460,494 | 7/1923 | Miller | 152—76 |
| 2,008,933 | 7/1935 | Sinclair | 301—65 |
| 3,250,571 | 5/1966 | Richter | 301—65 |

OTHER REFERENCES

Motor Trend Magazine, April 1965, pages 30 and 45.

RICHARD J. JOHNSON, *Primary Examiner.*